US012283155B2

(12) United States Patent
Jadeja et al.

(10) Patent No.: US 12,283,155 B2
(45) Date of Patent: Apr. 22, 2025

(54) SYSTEMS AND METHODS FOR SUPPORTING ONE OR MORE EXTERNAL APPLICATIONS AT A GAMING DEVICE

(71) Applicant: Aristocrat Technologies, Inc., Las Vegas, NV (US)

(72) Inventors: Rajendrasinh Jadeja, Las Vegas, NV (US); Xiaoqiang Gong, Henderson, NV (US); Bruce Urban, Las Vegas, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 371 days.

(21) Appl. No.: 17/817,616

(22) Filed: Aug. 4, 2022

(65) Prior Publication Data

US 2023/0060608 A1 Mar. 2, 2023

Related U.S. Application Data

(60) Provisional application No. 63/239,055, filed on Aug. 31, 2021.

(51) Int. Cl.
*G07F 17/32* (2006.01)

(52) U.S. Cl.
CPC ........ *G07F 17/323* (2013.01); *G07F 17/3209* (2013.01); *G07F 17/3211* (2013.01)

(58) Field of Classification Search
CPC . G07F 17/323; G07F 17/3209; G07F 17/3211
See application file for complete search history.

(56) References Cited

U.S. PATENT DOCUMENTS

| | | | | |
|---|---|---|---|---|
| 7,290,072 | B2 | 10/2007 | Quraishi | |
| 7,749,081 | B1 * | 7/2010 | Acres | G07F 17/32 463/31 |
| 10,733,830 | B2 | 8/2020 | Jadeja | |
| 11,227,465 | B1 * | 1/2022 | Colvin | G07F 17/3239 |
| 2003/0054868 | A1 * | 3/2003 | Paulsen | G07F 17/3209 463/1 |
| 2005/0113163 | A1 * | 5/2005 | Mattice | G07F 17/32 463/16 |
| 2007/0054741 | A1 | 3/2007 | Morrow | |
| 2010/0120538 | A1 | 5/2010 | Dewitt | |
| 2014/0364199 | A1 * | 12/2014 | Baerlocher | G07F 17/3244 463/25 |
| 2016/0019746 | A1 * | 1/2016 | Lyons | G06Q 20/3224 463/31 |

(Continued)

*Primary Examiner* — Justin L Myhr
*Assistant Examiner* — Carl V Larsen
(74) *Attorney, Agent, or Firm* — Armstrong Teasdale LLP

(57) ABSTRACT

An electronic gaming device is described. The electronic gaming device includes a button deck including a display device, at least one memory with instructions stored thereon, and at least one processor in communication with the display device and the at least one memory. The instructions, when executed by the at least one processor, cause the at least one processor to receive, from an end user device associated with a player account, a signal that includes player data, parse the player data, and control the display device to display at least a portion of the player data in a display area of the display device, wherein a location of the display area is predefined in the at least one memory.

17 Claims, 11 Drawing Sheets

(56) References Cited

U.S. PATENT DOCUMENTS

| | | | | |
|---|---|---|---|---|
| 2016/0133089 | A1* | 5/2016 | Roemer | G07F 17/3218<br>463/40 |
| 2016/0284166 | A1* | 9/2016 | Nelson | G07F 17/3251 |
| 2019/0096181 | A1* | 3/2019 | Lyons | G07F 17/3241 |
| 2019/0164384 | A1* | 5/2019 | Soukup | G07F 17/3239 |
| 2020/0193767 | A1* | 6/2020 | Jadeja | G07F 17/3209 |
| 2020/0293179 | A1* | 9/2020 | Anderson | G06F 16/54 |
| 2020/0327773 | A1 | 10/2020 | Jadeja | |
| 2020/0410813 | A1* | 12/2020 | Petersen | G06Q 20/3276 |
| 2021/0390823 | A1* | 12/2021 | Dalmia | G07F 17/3223 |
| 2023/0162557 | A1* | 5/2023 | Sumi | H01H 13/20<br>463/37 |
| 2023/0196868 | A1* | 6/2023 | Sumi | H01H 13/14 |

* cited by examiner

SYSTEMS AND METHODS FOR SUPPORTING ONE OR MORE EXTERNAL APPLICATIONS AT A GAMING DEVICE

CROSS REFERENCE TO RELATED APPLICATION

This application claims the benefit of priority to U.S. Provisional Patent Application No. 63/239,055, filed Aug. 31, 2021, which is hereby incorporated by reference in its entirety.

TECHNICAL FIELD

The field of the disclosure relates generally to electronic gaming and, more specifically, to systems and methods for supporting one or more external applications at a gaming device.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

Current casino environments include EGMs that physically host electronics for an external application called player tracking. In some cases, player tracking information may be displayed on a different display from, for example, a display for a game or a display for a button deck. More recently, the external application has moved to "stealing" screen space to run its video output by deploying a video splitter that, as examples, shrinks display of an electronic game or a button deck to create room on the display device to display the tracking information. Shrinking a displayed game or button deck distorts the video presentation while the external application runs.

For example, a game provider may design and ship a game to a gaming establishment (e.g., a casino). The gaming establishment may have its own loyalty or player tracking program. Thus, when the game (e.g., EGM) arrives at the casino, a casino technician would install a video splitter to distort/shrink display of the game and/or button deck in order to display player tracking information (e.g., associated with that gaming establishment) in a different area of the device where the electronic game is being displayed. This is undesirable because oftentimes game designers spend significant amounts of time on game presentation design (e.g., shape and size of animations/text/symbols for clear communication to players). Use of a video splitter also has delayed the implementation of new technology such as 4K, as the video splitter must be updated frequently.

BRIEF DESCRIPTION

In one aspect, an electronic gaming device is described. The electronic gaming device includes a button deck including a display device, at least one memory with instructions stored thereon, and at least one processor in communication with the display device and the at least one memory. The instructions, when executed by the at least one processor, cause the at least one processor to receive, from an end user device associated with a player account, a signal that includes player data, parse the player data, and control the display device to display at least a portion of the player data in a display area of the display device, wherein a location of the display area is predefined in the at least one memory.

In another aspect, an electronic gaming system is described. The electronic gaming system includes a button deck including a display device, at least one memory with instructions stored thereon, and at least one processor in communication with the display device and the at least one memory. The instructions, when executed by the at least one processor, cause the at least one processor to receive, from an end user device associated with a player account, a signal that includes player data, parse the player data, and control the display device to display at least a portion of the player data in a display area of the display device, wherein a location of the display area is predefined in the at least one memory.

In yet another aspect, a method of displaying data at a button deck of an electronic gaming device wherein the method is implemented by at least one memory and at least one processor is described. The method includes receiving, from an end user device associated with a player account, a signal that includes player data, parsing the player data, and controlling a display device of the button deck to display at least a portion of the player data in a display area of the display device, wherein a location of the display area is predefined in the at least one memory.

DETAILED DESCRIPTION

Figure 1:
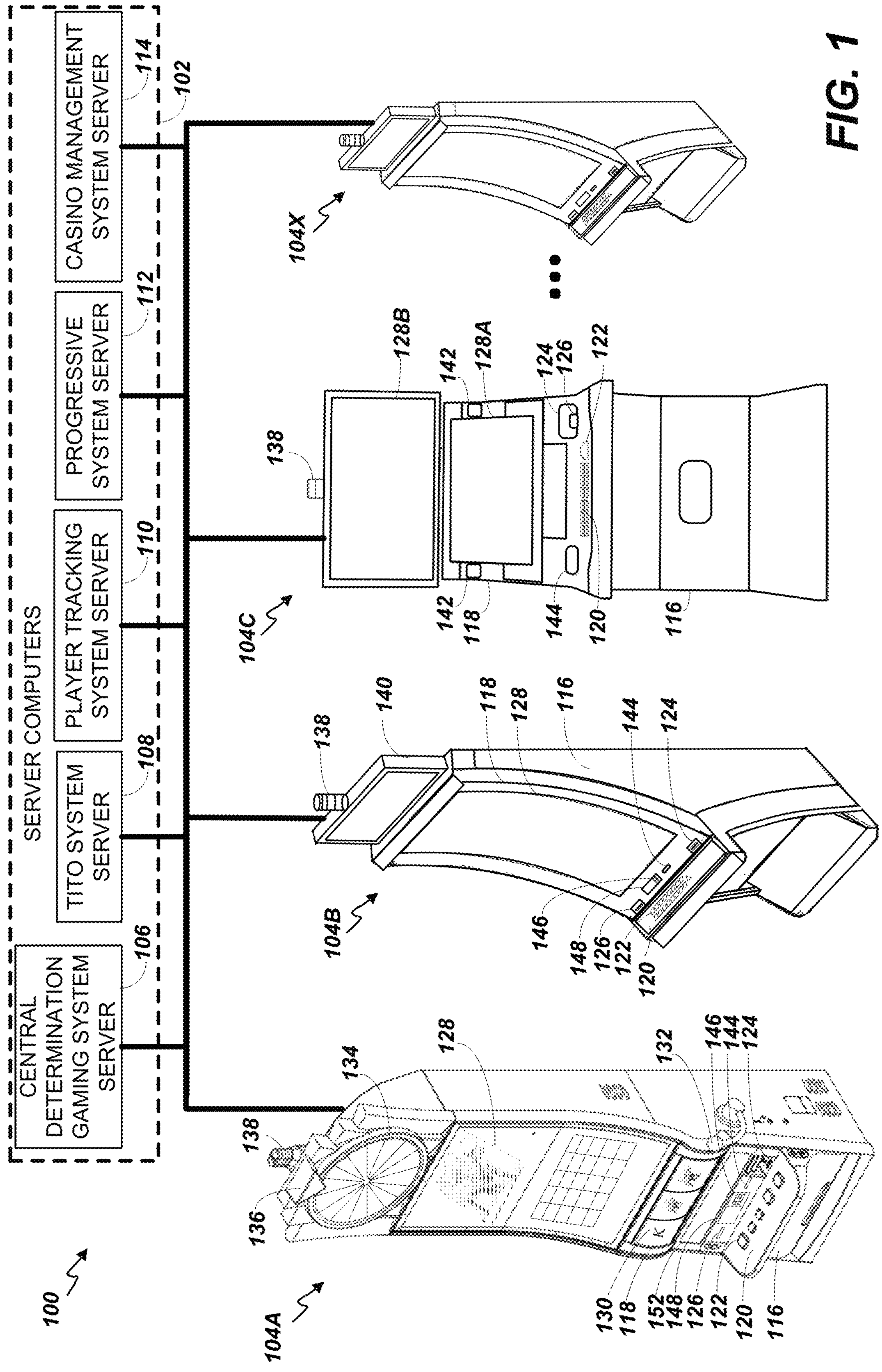
FIG. 1 is an exemplary diagram showing several EGMs networked with various gaming related servers.

Systems and methods for supporting one or more external applications at a gaming device are described herein. As used herein, external application may mean an application executed on/hosted by an end user device of a player (e.g., an "app" at an end user device such as a mobile/smart phone, tablet, etc.). Further, "player data" as used herein may include any data stored at or received by an end user device (e.g., player tracking data, online gaming data, and/or any other data stored at or received by the end user device). The player data may then be transmitted from an end user device (e.g., and/or server) to a gaming device.

In some embodiments, a mobile computing device (e.g., end user device) may be connected to a gaming device/button deck using a physical interface, such as a wired connection. In some embodiments, the mobile computing device may be connected to the gaming device/button deck using a wireless interface, such as a BLUETOOTH, WiFi, NFC, and/or any other suitable wireless interface. The button deck and/or a gaming device of the button deck may include a device, such as a parser, configured to filter or otherwise obtain at least one signal component from a signal provided by the mobile computing device, such as a video signal and/or player information (e.g., player tracking information). The video component of the signal may be displayed on the button deck, such as on a display device of the button deck, for convenient access by the player during gameplay as well as to conserve space for display of an electronic game on a main display of the gaming device. In the example embodiment, the area where the parsed signal is displayed is stored in memory (e.g., so that it is predetermined where the parsed information is displayed, and no video "splitting" or "shrinking" is required).

In some embodiments, the parser may be disposed within the button deck to parse an incoming signal from a mobile device. Likewise, in at least some embodiments, a relay device may be included in the gaming device and/or in the button deck to accommodate the same, or similar, functionality. In some embodiments, one or more connectors may be used to couple the button deck to a system bus (or "backplane"), to facilitate communication of data received from the mobile computing device back and forth between the button deck, gaming device, and/or mobile computing device. In embodiments that use the relay device as an intermediate component coupled between the button deck and the gaming device, the relay device may be included in a button deck during manufacture and/or retrofitted in the button deck to enhance the functionality of the button deck and gaming device.

In the example embodiment, a protocol (or extension) allows a processing unit of an external application (e.g., at an end user device and/or server in communication with the end user device and/or gaming device) to directly work with a gaming device to utilize capabilities of the gaming device (e.g., its peripherals, internal input and output devices) without disrupting the game and presenting the information in a neat and orderly manner. The gaming device operating system manages the priority (e.g., based upon stored priority rules) and placement of the outputs/inputs required by the external application(s) (e.g., player tracking). The gaming device has the ability to host multiple applications.

In some embodiments, player tracking information is displayed on the button deck display and/or a main display. Sound/audio outputs may also be provided (e.g., audio messages regarding player loyalty/tracking, such as congratulatory messages when a player completes an achievement related to the external application). In some embodiments, a touch pad interface (e.g., an input area) is displayed for input of security codes. Inputted security codes may be compared to stored security codes (e.g., associated with player accounts). In some embodiments, a feed from a camera or sensor within the gaming device is utilized along with the external application (e.g., to verify the identity of a player by biometric matching or QR code (static or dynamic), as examples).

Further, a player account may be connected to an online environment. The present disclosure allows for mobile device applications and information to be presented on the gaming device. For example, the mobile device applications may include an online gaming application, operator website, and/or other applications.

In some embodiments, the external application is enabled using Game to System (G2S) and Slot Accounting System (SAS) protocols with appropriate extensions to communicate with the gaming device. Information, such as presentation layer data sent to the gaming device, may be translated and displayed in appropriate (e.g., predetermined) form on a designated/predetermined portion of the button deck or main display (e.g., to remove the need for video splitting). This information may be transmitted to the gaming device via Ethernet or Serial connections. In addition, external devices can communicate with the gaming device via Bluetooth or other Near Field Communication (NFC) technology. In some embodiments, an input device such as keypad may be presented at the gaming device for the player to input security codes when a player requests to connect to the gaming device (e.g., a connection request). The gaming device may then transmit the inputs back to the application (e.g., or a server) to verify/authenticate player identity.

In some embodiments, gaming device information (e.g., what display space is available to the external application such as screen size or pixels per inch, touch capabilities, etc.) is transmitted to the application. The application may then utilize the gaming device information to determine what data to provide back to the gaming device for display. In some embodiments, the application is not aware of the gaming device information (e.g., as described above) and a parser of the gaming device determines what information received from the application (e.g., at the end user device) to display. For example, rules may be stored in memory (e.g., in one or more lookup tables) that the parser utilizes in order to determine what received information to display, when to display the information, and how to display the information. For instance, the gaming device may wait to display information received from the end user device until a bonus/celebratory animation has completed at the gaming device (e.g., in response to the player winning a jackpot or bonus).

In other words, applications may be hosted on an end user device of a player. A gaming device may connect to the end user device and receive data from the one or more applications. Data from the one or more applications is parsed in order to determine which information to display, when to display it, and how to display it. Further, protocols/rules defining interaction/priority of multiple applications may be defined/stored such that the parser can determine which information from which applications to display when.

In some embodiments, a gaming device display area may be re-sized or scaled for external application data. Font size may be pre-determined during the re-sizing or scaling design phase based on EGM screen resolution (e.g., 4K or 2K). Data received from phones of different sizes do not cause problems with visual clarity because of the font sizing (e.g., re-sizing and/or scaling) based on screen resolution. In some embodiments, an option may be provided (e.g., to a player and/or casino operator) to match a display area at the gaming device with a size of a phone screen. Data passed to the gaming device may be converted into an easily readable format (e.g., by the gaming device and/or by the player mobile device (e.g., based upon information received from the gaming device and/or stored and associated with the application)).

In some embodiments, for example, an external application related to player tracking and an external application related to an electronic game may be executed at an end user device of a player. The end user device may connect to the gaming device, and the gaming device may receive data regarding the one or more applications from the end user device. The gaming device then determines when and where to display information associated with the player tracking application and/or the game information. For example, the gaming device may determine from the player tracking application that it is the player's birthday and change display of a theme of a game in response to determining that it is the player's birthday (e.g., providing birthday celebration scenes/animations). Further, a game at the gaming device may be related to the electronic game external application. By playing the game at the gaming device, the player may earn/satisfy one or more achievements associated with the electronic game external application (e.g., one or more plays, playing for a certain amount of time, playing at a number of locations, etc.). Accordingly, the gaming device may receive data regarding the satisfied achievement from the end user device and cause display of information indicating that the player earned the achievement.

It should be appreciated that any number and/or a variety of external applications are envisioned as being supported by a gaming device in the embodiments described herein. As examples, external applications may include travel, food & beverage, entertainment applications (e.g., associated with reward programs and/or achievements/goals for the player to achieve), or any other application ("app"). Rewards and/or other information in the external applications may be achieved by the player connecting their mobile device to, playing a game at a gaming device, or the player meeting other criteria. Accordingly, by way of the systems and methods described herein, the gaming device receives data (e.g., player data) regarding the external applications, parses the data, and determines what to display on the gaming device and when/where to display it (e.g., based upon rules stored in memory). Accordingly, the gaming device, by supporting all external applications, receives more data than was previously known to gaming devices and can cause display (and/or other output, such as sound) of information related to those external applications in predetermined ways and without the need for one or more video splitters that are problematic at least for the reasons described herein.

In some embodiments, preferences may be defined by a player (e.g., in their player account). Accordingly, the gaming device may receive data (e.g., from an end user device or player tracking server) regarding when/where/how the player prefers certain information be displayed. For example, the player may want information to be displayed regarding certain external applications and not others. Further, the player may be able to select where they prefer certain information be displayed. Yet further, the player may be able to define which game they desire to play at the gaming device. Accordingly, player preferences communicated to the gaming device may not only cause information regarding external applications to be displayed based upon certain rules, but may also cause changes to game play on the gaming device (e.g., which game is played, how certain game information is displayed (e.g., font size, color, certain animations/symbols, etc.)).

In some embodiments, a player may be able to select (e.g., at the gaming device or end user device) which applications the gaming device should display information about. For example, the gaming device may cause display of an icon area/task bar including icons relating to different external applications (e.g., pre-stored and/or based upon data received from the end user device regarding which external applications are used by the end user device). Accordingly, a player may be able to select (e.g., via touch screen capability at the icon area) which application(s) the gaming device should display information about. In some embodiments, the icons displayed in the icon area may be modified if a notification regarding the icon (e.g., the application associated with the icon) is received by the gaming device. For example, the gaming device may receive data from an external application at the end user device indicating that the player received a text message and may notify a player that a text message was received at the end user device. As another example, the player may have an upcoming dinner reservation. Accordingly, an external application at the end user device (e.g., associated with a restaurant and/or other application where reservations can be made) may communicate to the gaming device that a reservation is upcoming, the gaming device may parse the communication and cause display of a notification that the player has an upcoming dinner reservation. As such, certain supported external applications may be related to game play (e.g., player tracking, mobile gaming applications) while others are not related to game play (e.g., rideshare, travel, food & beverage, entertainment, etc.).

It should be appreciated that the external applications described herein may be any application at an end user device, and accordingly player data may include data regarding any notifications/signals/data that may be received at or stored at the end user device and communicated to the gaming device (e.g., that a rideshare/taxi requested by the player is arriving soon/has arrived (e.g., travel data), that a flight associated with the player is delayed (e.g., travel data), that a hotel room is ready for a player (e.g., lodging data), that a delivery has arrived for the player (e.g., food data), that tickets for an event have been transferred to an account associated with the player (e.g., event data), a live event notification (e.g., event data—an event has started/ended), a social media) notification (e.g., social media data, and so forth). The systems and methods described herein also "open up" (e.g., configure) the gaming device for future external applications such that the future external applications can utilize the gaming device capabilities to cause display of certain information and interact with the player via the gaming device.

The gaming device parses the information and determines (e.g., based upon rules in memory) which information to display to the player (e.g., the notification may be as simple as a notifying the player that a notification was received at their end user device, and/or the notification may include more/all pertinent data relating to the notification—in one example, the gaming device may notify the player that a text message was received at their end user device, while in another example the gaming device may display the text of the text message itself). In some embodiments, players may be able to select how notifications are displayed and/or what data is transmitted to the gaming device (e.g., for security purposes).

In some embodiments, the gaming device may be "game aware" or otherwise more "aware" (e.g., as related to mobile game applications or other applications on an end user device of a player). In other words, in addition to receiving certain data regarding external applications from an end user device of a player, the gaming device may also be in communication with one or more computing devices (e.g., servers) storing player information as it relates to the application(s). Accordingly, the gaming device may determine that an achievement with respect to a mobile game application (or other application) is met (e.g., or other notification should be presented to the player) by way of a communication received from a server or other computing device (e.g., as opposed to directly receiving the information from the end user device).

At least some technical problems addressed by the systems and methods described herein include: i) costly hardware (e.g., video splitters and related components) currently required to implement an external (e.g., player tracking) application at a gaming device; ii) high manufacturing and/or maintenance time/cost required for the hardware; iii) lack of the ability of gaming devices to support one or more external applications; iv) lack of the ability of gaming devices to support one or more external applications in an organized manner (e.g., while not changing display of a game and/or button deck); and v) slow time to market because of required updates to a video splitter.

At least some technical solutions presented by the systems and methods described herein include: i) less required costly hardware (e.g., no video splitter and related components); ii) reduced manufacturing time/cost and maintenance time/cost because of the reduced hardware; iii) ability of gaming devices to support one or more external applications; iv) ability of gaming devices to support one or more external applications in an organized manner (e.g., while not changing display of a game and/or button deck); and v) quicker time to market of newer display technology with the removal of the video splitter.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
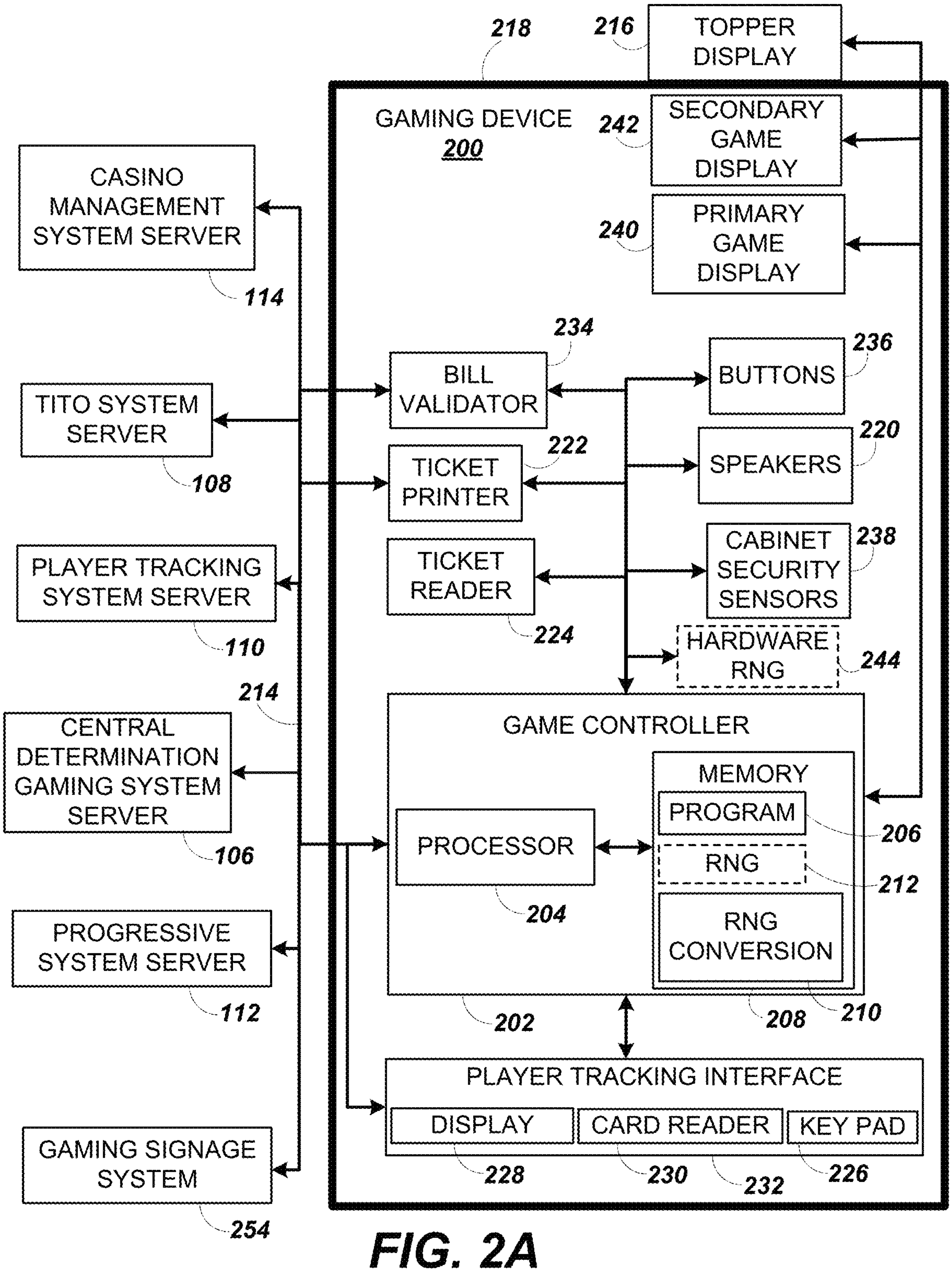
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video blackjack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
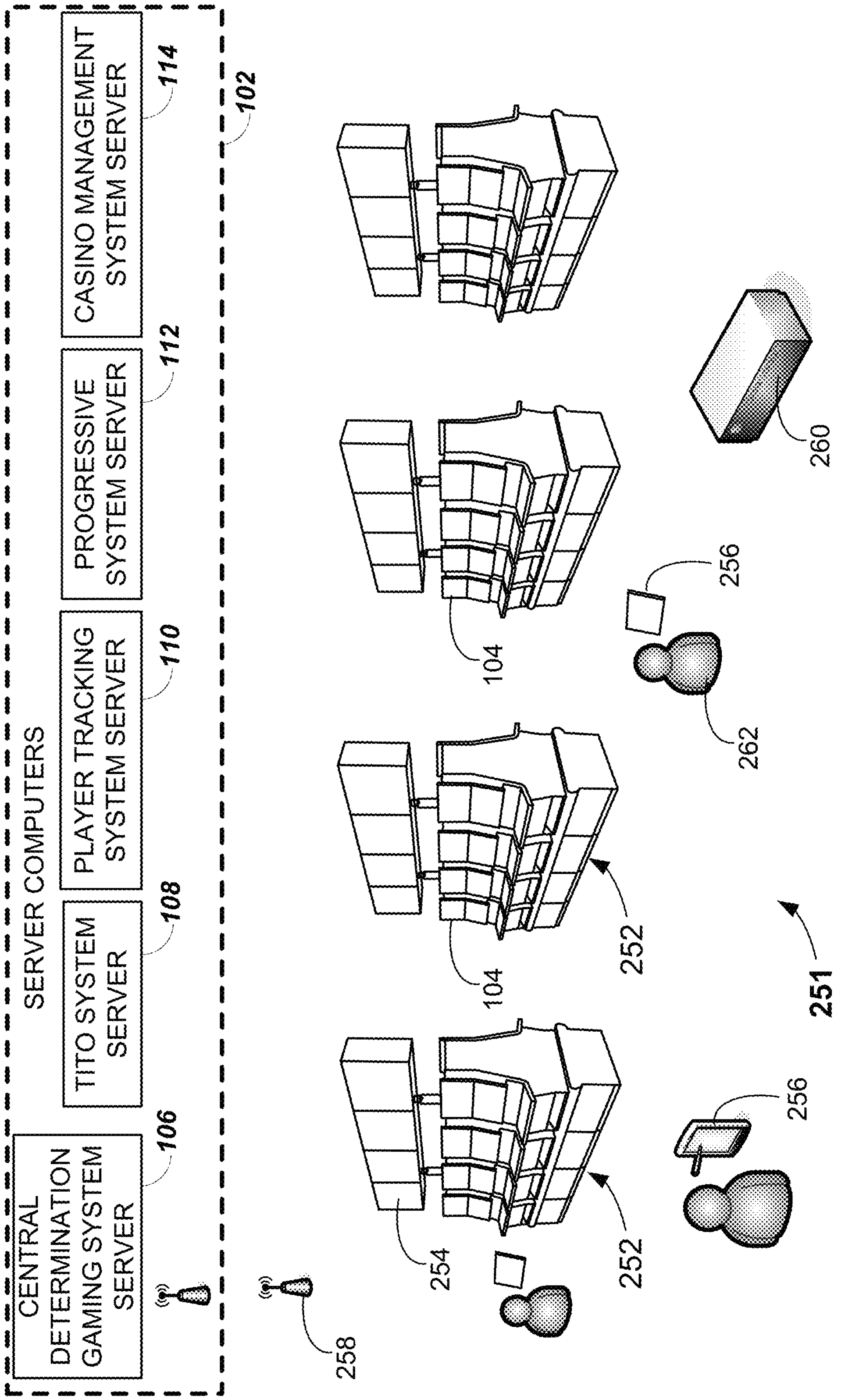
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
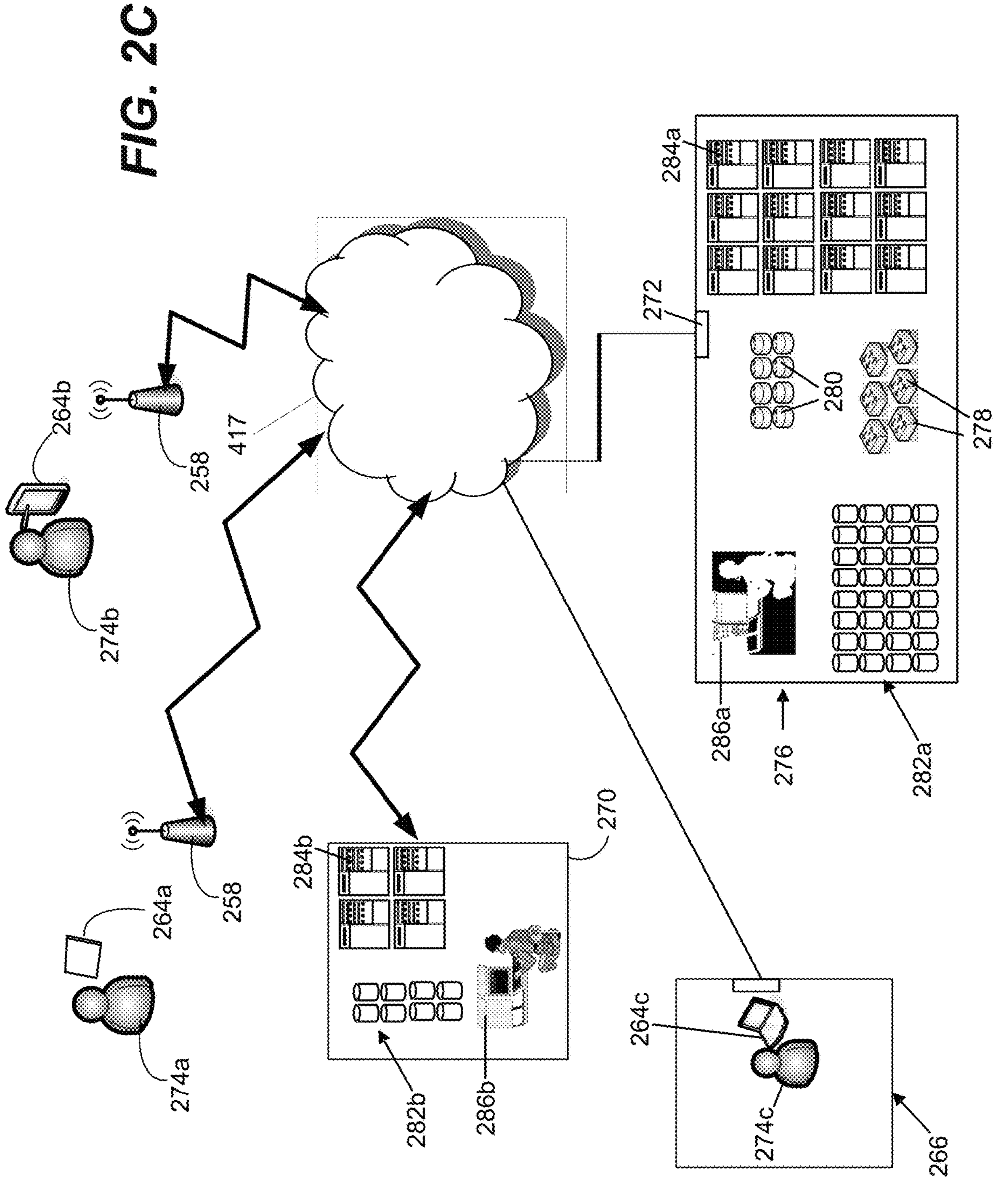
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 570*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
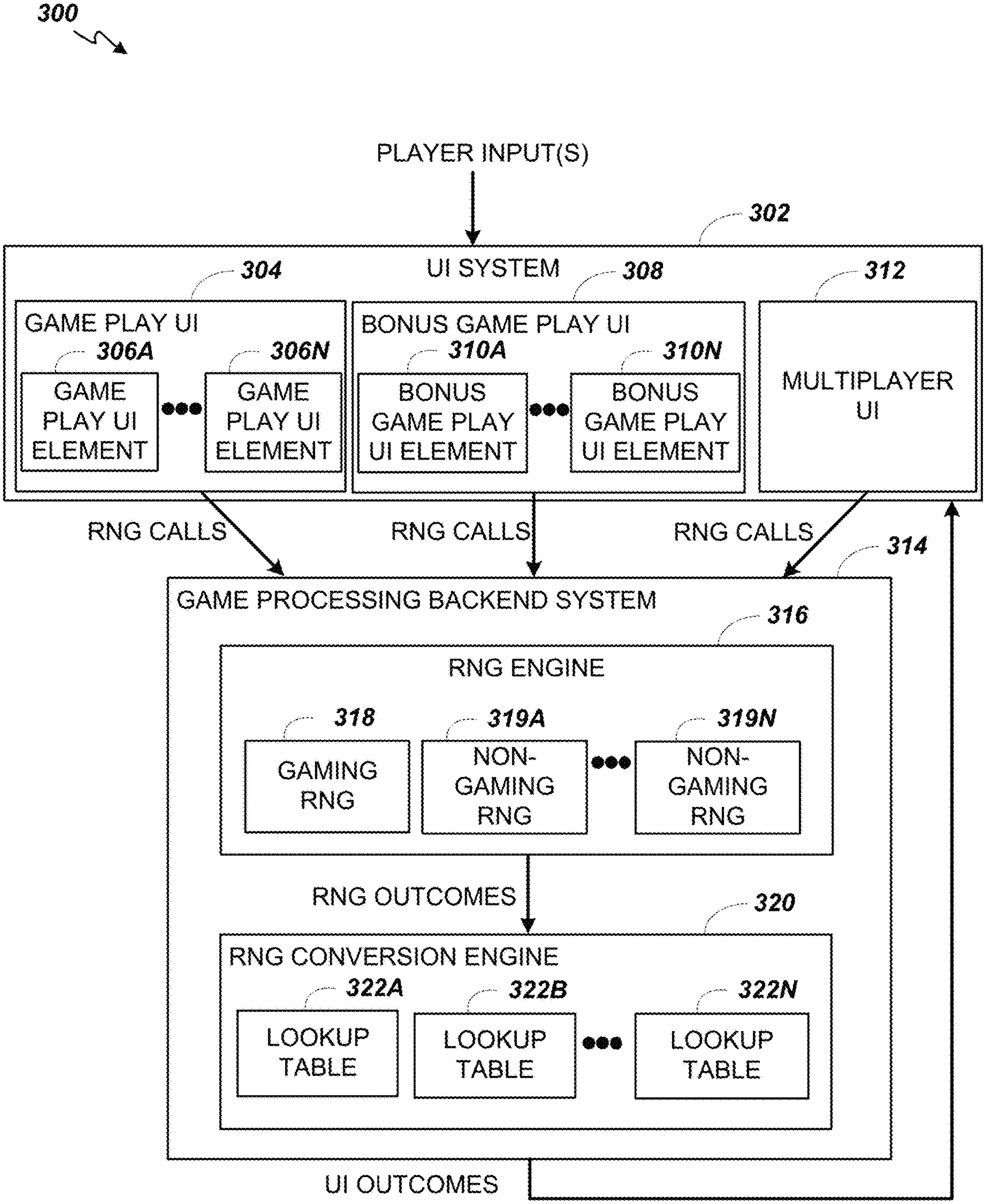
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 4:
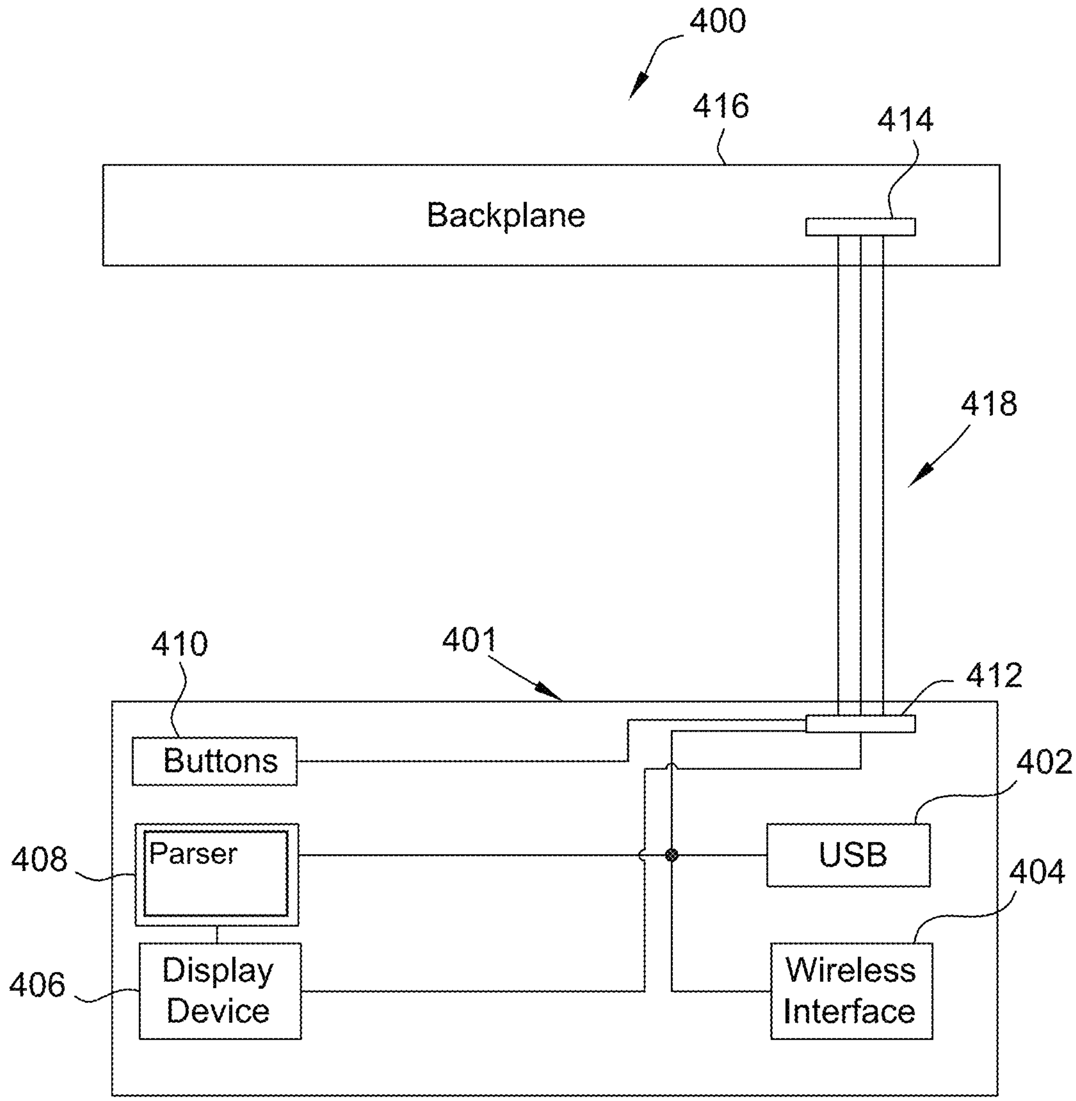
FIG. 4 illustrates an example block diagram of a gaming device as shown in FIGS. 1-3, including a button deck having a plurality of interfaces that allow connectivity with a mobile computing device of a player.

FIG. 4 is a block diagram of a gaming device 400, such as gaming device 104A, as shown in FIGS. 1-3. Gaming device 400 includes a button deck assembly (or "button deck") 401, such as button deck 120, having a plurality of interfaces that allow connectivity with an end user device (e.g., a mobile computing device) of a player. Accordingly, in the example embodiment, button deck 401 includes one or more interfaces, such as a physical interface 402 and/or a wireless interface 404. In at least some embodiments, physical interface 402 may include any of a variety of suitable physical interfaces, such as, but not limited to, any USB connector and/or interface, any USB-C connector and/or interface, and the like. Similarly, wireless interface 404 may include any of a suitable variety of wireless interfaces, such as, but not limited to, any BLUETOOTH interface, any WiFi interface, any near field communications (NFC) interface, and the like.

In the example embodiment, button deck 401 may also include a display device 406, such as a liquid crystal display (LCD), and/or any other suitable display device, as generally known in the art and as described elsewhere herein. In the example embodiment, button deck 401 may additionally include a parser 408, which may be connected, such as by one or more wires, to one or both of physical interface 402 and/or wireless interface 404. In at least some embodiments, parser 408 may receive a signal from either or both of physical interface 402 and/or wireless interface 404.

Although parser 408 is described herein, in some embodiments, another signal filtering component or device may be used, such as in addition to and/or as an alternative to, parser 408. For example, any of a variety of signal filtering and/or signal processing devices may be implemented, including a processor and/or another integrated circuit or "IC" (such as an FPGA) configured to perform the desired signal processing and/or filtering operations.

Further, although in some embodiments, parser 408 (and/or another processor or IC) may facilitate one-way communications from the player's mobile computing device to button deck 401, in some embodiments, the parser 408 and/or another processor or IC included in place of and/or in addition to parser 408 may facilitate two-way communications, such as to allow the player to select a digital wallet account from a digital wallet and/or otherwise interact with an software application executing on the player's mobile computing device (e.g., a player app), as described in additional detail herein.

In addition, parser 408 may divide or otherwise filter the signal received from either or both of physical interface 402 and/or wireless interface 404 to separate one or more components of the received signal into individual sub-components. For example, in at least one embodiment, parser 408 may separate a video output signal received via physical interface 402 and/or wireless interface 404 from one or more other sub-components, such as control components, audio components, and the like, to obtain an isolated and/or otherwise distinct video signal or video feed, which may, as described herein, be received from a mobile computing device of a player, such as a smartphone and/or tablet computing device coupled to button deck 401 via physical interface 402 and/or wireless interface 404.

In at least some embodiments, button deck 401 may include one or more buttons 410, such as one or more mechanical pushbuttons. In at least some embodiments, buttons 410 may also include software or "virtual" buttons displayed by display device 406.

Moreover, as shown, in at least one embodiment, button deck 401 may include a connector 412 that communicatively couples button deck 401 to a connector 414 of a backplane 416 via a wiring harness 418. Specifically, connector 412 may connect display device 406, parser 408, and/or buttons 410 to connector 414 of backplane 416 via wiring harness 418, which as shown, may include one or more wires (or "channels") for each of the distinct signals carried between button deck 401 and backplane 416. In various embodiments, it will be appreciated that backplane 416 may include a group of electrical connectors in parallel with one another to form a system bus of gaming device 400.

Accordingly, in the example embodiment, buttons 410 of the button deck 401 are connected to backplane 416 of the gaming device 400 through wiring harness 418. In addition to connecting buttons 410 to backplane 416, in at least some embodiments, parser 408 and/or display device 406 may also be connected to backplane 416 via wiring harness 418. Wiring harness 418 thus includes multiple independent signal wires that are configured to provide signals, as described herein, to and/or from backplane 416, such as whenever each particular button 410 is pressed by a player, to display graphics on display device 406 and/or a display device of gaming device 400, such as main display 128, and the like. Additional details related to backplane 416 and other features are in some cases described with reference to U.S. patent application Ser. No. 17/212,658, filed Mar. 25, 2021, which is hereby incorporated by reference in its entirety.

During operation, in at least some embodiments, gaming device 400 may be configured to perform various game functions or gaming session functions based on player inputs provided through buttons 410, such as altering wagering amounts, initiating game play (e.g., spinning reels), cashing out of a current game session, requesting service or assistance, and the like. Various game and system processes executing on the gaming device 400 may rely upon the signals from the buttons 410 to determine when to perform related functions.

In addition to these features, in the example embodiment, one or more input signals, such as from a mobile computing device of a player (e.g., a smartphone) may be received via physical interface 402 and/or wireless interface 404. The signal received from the mobile computing device may include, for example, a video signal, an audio signal, and/or one or more other signals, such as control signals, and the like. To couple a mobile computing device to physical interface 402, a player may connect a suitable cable, such as a USB or USB-C cable, between a connector or output port of the mobile computing device and physical interface 402. Similarly, a player may wirelessly connect a mobile computing device to button deck 401 via wireless interface 404, such as by pairing or otherwise communicatively coupling the mobile computing device to button deck 401. Notably, a player may connect a mobile computing device to a different component of device 400 (e.g., not included in button deck 401) in order to establish communication with device 400 (e.g., and parser 408).

In response to establishing a physical and/or wireless connection between a player's mobile computing device and button deck, the mobile computing device may provide one or more signals, such as at least a video signal, to button deck 401 via parser 408, which may receive and/or otherwise parse, process, or filter the received signal. As described herein, in the example embodiment, parser 408 may filter the signal received from the mobile computing device via physical interface 402 and/or wireless interface 404 to obtain one or more desired components of the received signal, such as the video portion of the signal.

For example, in at least one embodiment, parser 408 may parse or separate a video output signal received via physical interface 402 and/or wireless interface 404 from one or more other sub-components, such as control components, audio components, and the like, to obtain an isolated and/or otherwise distinct video signal or video feed, which may, as described herein, be received from a mobile computing device of a player, such as a smartphone and/or tablet computing device coupled to button deck 401 via physical interface 402 and/or wireless interface 404.

In response to obtaining the desired signal component (or sub-component), parser 408 (and/or another processing element, such as a computer processor, and IC, and the like) may provide the video signal (or other sub-component) to display device 406 of button deck 401. In some embodiments, parser 408 may provide the video signal to any display device of gaming device 400. As a result, in the example embodiment, a video output of a player's mobile computing device, such as the player's smartphone, may be provided to display device 406 of button deck 401. Stated another way, the video output of a player's mobile computing device may be provided to display 406, such that the video output is displayed on display device 406 of button deck 401 and addition to and/or as an alternative to display the output of the player's mobile computing device on the mobile computing device itself At least one technical improvement associated with providing the video output of a mobile computing device on display device 406 of button deck 401 is that the player may have convenient access while playing gaming device 400 to any of the information that might be presented on the player's mobile computing device. This may include any of a wide variety of information, such as text messages, incoming telephone calls, a website that the player is viewing in a browser of the player's mobile computing device, and the like.

Further, in the example embodiment, the player's mobile computing device may include a software application (or "player app") associated with a casino or loyalty club account of the player. The app may provide the player access to a variety of account information, such as a digital wallet of the player, player tracking and player account information, loyalty information, such as loyalty points, and the like. In the example embodiment, player app information may also be obtained from the player's mobile computing device and displayed on display device 406 of button deck 401. As a result, the player may have convenient access to any information that might be displayed in a player app on display device 406 of button deck.

To illustrate further, in at least one embodiment, a player may utilize display device 406 and/or buttons 410 of button deck 401 to access a digital wallet of the player, provided via the player's mobile computing device. For example, the player may select a digital wallet account from the digital wallet displayed on display device 406 to access funds stored therein as well as to apply selected funds to a gaming session for placing one or more wagers on the gaming device 400. In these and other embodiments, parser 408 and/or another processor or IC in button deck 401 may facilitate bi-directional or two-way communications with the player's mobile computing device. In some embodiments, uni-directional communications may also be suitable for accessing a digital wallet. For example, digital wallet information may be provided by the player's mobile computing device to button deck 401. The digital wallet information may include, for example, a digital wallet account identifier, which may be used to grant access, in conjunction with authentication information entered by the player via buttons 410, to grant access to the player's digital wallet and/or one or more digital wallet accounts, which may be credited, debited, and the like to facilitate gameplay on gaming device 400.

Moreover, in the example embodiment, another technical improvement provided by button deck 401 is that information may be displayed on button deck 401 rather than consuming display space on main display 128 and/or causing display of other information (e.g., virtual buttons) on display device 406 to shrink. For example, in some traditional games and/or gaming applications, a player may insert a player tracking card in gaming device 400, and in response, player tracking information associated with the player, such as loyalty points, and other information, may be displayed on main display 128. However, in these conventional implementations, the player tracking information may consume valuable space on the main display 128, and in some cases, may even scrunch or otherwise impair the visual appearance of the game provided on the main display 128 (e.g., the player tracking information may appear "squeezed in" and/or otherwise affect the way the game is displayed). These undesirable consequences of showing player tracking information on main display 128 may be alleviated altogether by providing the player tracking and other information, as described herein, on button deck 401.

Figure 5:
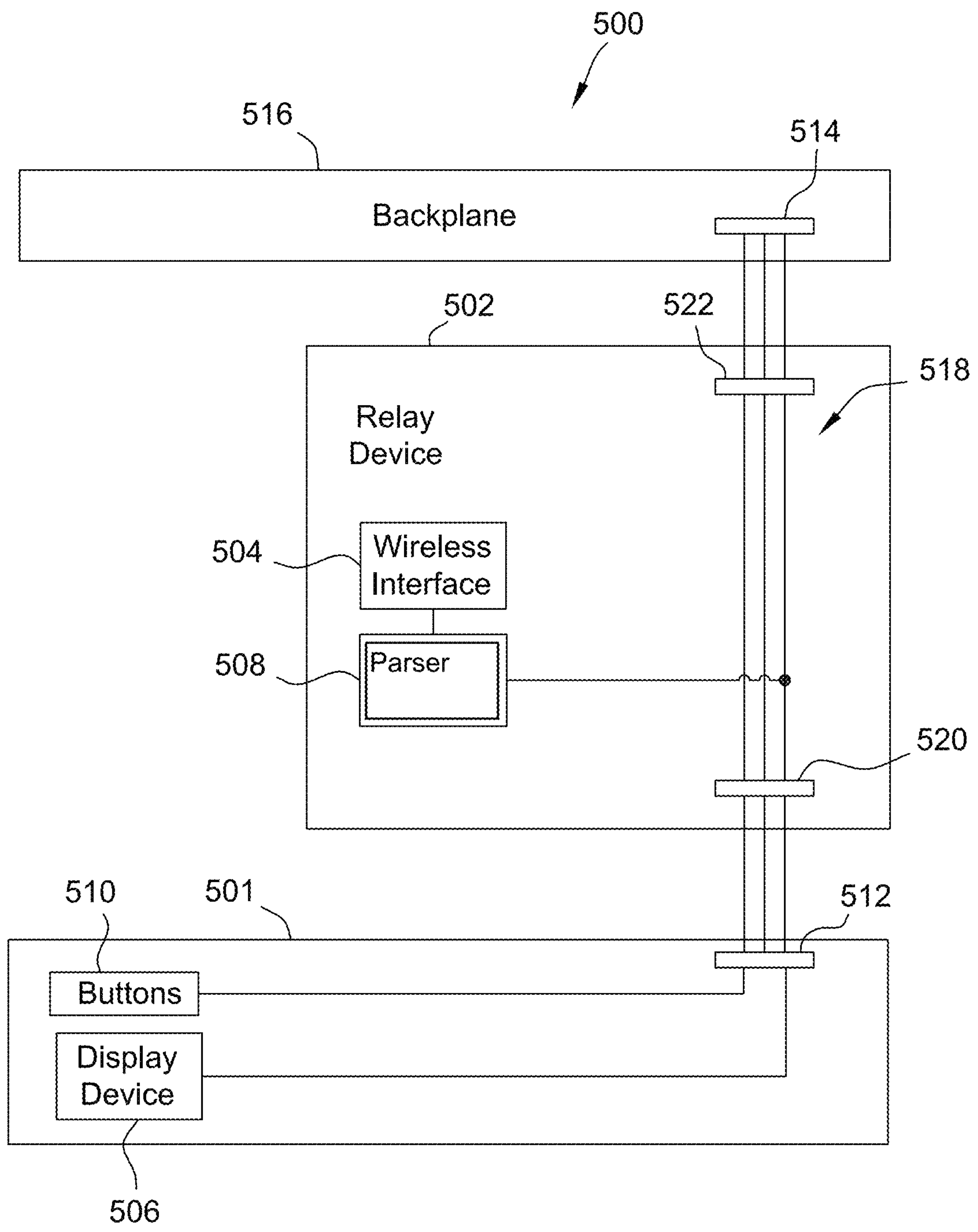
FIG. 5 illustrates an example block diagram of a gaming device as shown in FIGS. 1-3, including a relay device, that allows connectivity with a mobile computing device of a player.

FIG. 5 is a block diagram of a gaming device 500, such as gaming device 104A, as shown in FIGS. 1-3. Gaming device 500 includes a button deck 501. Button deck 501 includes a relay device 502 that allows connectivity with a mobile computing device of a player. Relay device 502 further includes a wireless interface 504 and a parser 508. As used herein, relay device 502 is a device for enabling communications between button deck 501 and a mobile computing device of the player. For example, relay device 502 may include an Internet of Things (IoT) device that may further include sensors, software, and other technologies that enable the EGM and/or button deck to connect and exchange data with other devices such as a mobile computing device of the player over the Internet or other communication network. In other words, relay device 502 may include any mechanical, electrical, electronic, and/or software device and/or any combination thereof that would allow for communications between the button deck and a mobile computing device of the player.

In the example embodiment, gaming device 500 is similar to gaming device 400, as described above, except that gaming device 500 includes relay device 502 connected between backplane 516 and button deck 501. In at least some embodiments, a wireless interface 504 is included in relay device 502 for communication with a mobile computing device of a player, as described herein. In the example embodiment, button deck 501 excludes a physical interface, such as physical interface 402 for wired connection with a mobile computing device of a player. However, in some embodiments, button deck 501 may include a physical interface. Wireless interface 504 may, in at least some embodiments, be the same as or similar to wireless interface 404. For example, wireless interface 504 may be a BLUETOOTH interface, a WiFi interface, an NFC interface, and/or any other suitable wireless interface for wireless connecting gaming device 500 with a player's mobile computing device, such as a player's smartphone or tablet.

In the example embodiment, relay device 502 may be included in gaming device 500 at the time of manufacture and/or retrofitted to an existing gaming device 500, such as to facilitate wireless communications, as described herein, with a player's mobile computing device. Moreover, in at least some embodiments, to connect relay device 502 between backplane 516 and button deck 501, relay device may include one or more connectors, such as a first connector 520 and/or a second connector 522, for coupling relay device 502 to button deck 501 and/or backplane 516, respectively.

Figure 6:
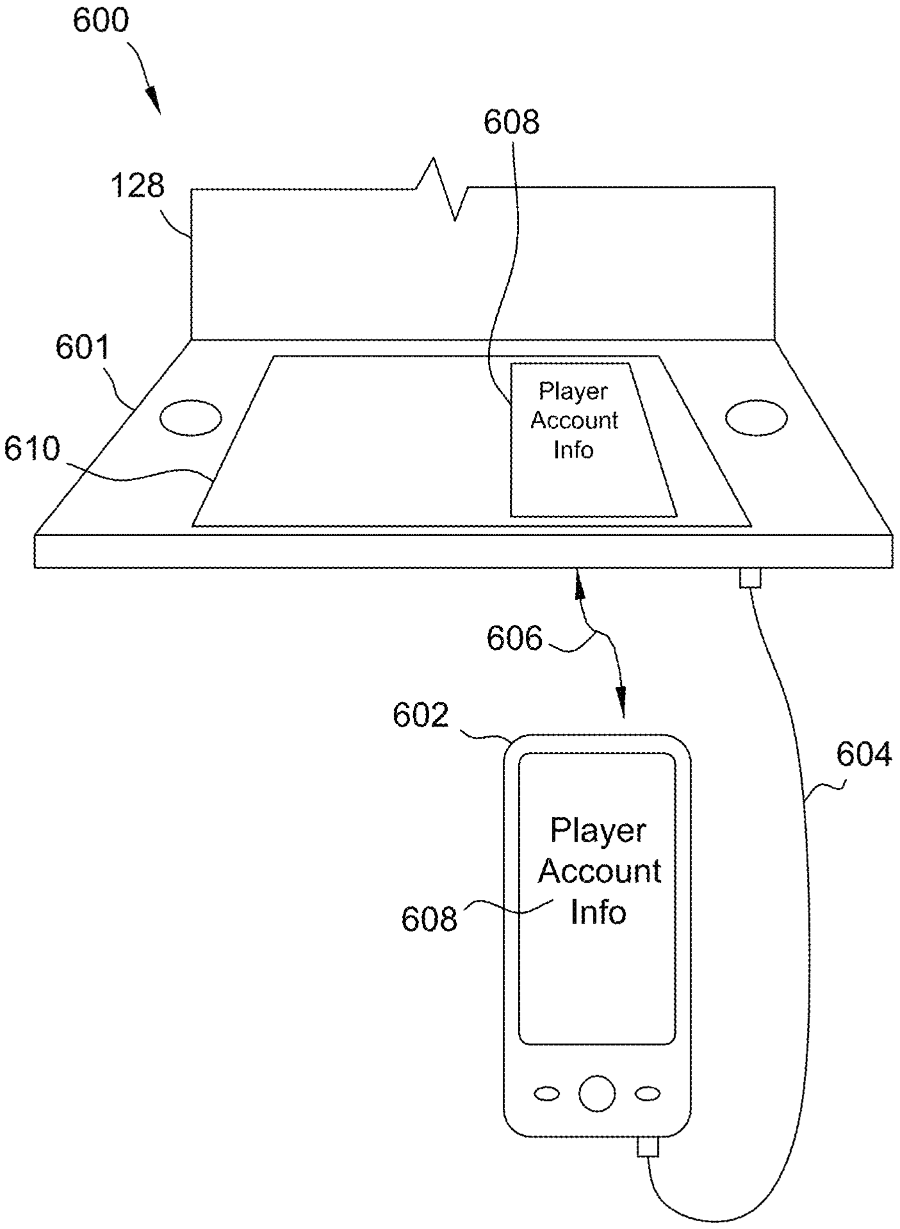
FIG. 6 illustrates an example button deck connected with a mobile computing device of a player, as shown in FIGS. 4 and 5.

FIG. 6 is a diagram of an example button deck 601, such as button deck 401 and/or 501, as described herein, connected with an end user device and/or mobile computing device 602 of a player, as shown in FIGS. 4 and 5. In the example embodiment, button deck 601 is included in a gaming device 600, such as gaming device 104A, gaming device 400, and/or gaming device 500, as generally described herein.

As described herein, and as shown, in some embodiments, mobile computing device 602 may connect to button deck 601 via a wired connection 604, such as using a USB cable, a USB-C cable, and the like. Similarly, in some embodiments, mobile computing device 602 may connect to button deck 601 via a wireless connection 606, such as via any BLUETOOTH, WiFi, NFC, and/or any other suitable wireless connection.

In the example embodiment, player tracking data 608 is displayed on mobile computing device 602 and communicated to button deck 601. The player tracking data 608 is also displayed on button deck 601, such as on a display device 610 of button deck 601 (e.g., in a predetermined area and while not shrinking display of other features displayed on device 610). As a result, information, such as player tracking data 608, may be displayed on button deck 601 rather than consuming display space on main display 128 and/or causing other information displayed on device 610 to shrink. As described herein, display of player tracking data 608 on button deck 601 may facilitate a more aesthetically pleasing display of a wagering game on main display 128 (e.g., because player tracking data 608 is provided via button deck 601 rather than main display 128), thereby conserving valuable space on main display 128.

Although player tracking data 608 is generally described, it will be appreciated that any other data capable of being displayed by mobile computing device 602 may also be displayed on button deck 601. Likewise, in some embodiments, the data received from mobile computing device 602 and displayed on button deck 601 may be reformatted. In some embodiments, mobile computing device 602 replicated or mirrored to button deck 601, such that the data displayed on button deck 601 appears in the same format that it is (or would be) displayed by mobile computing device 602.

Further, although data 608 is illustrated as being displayed on device 602 and device 610, it should be appreciated that in some embodiments data 608 is displayed on device 610 after being translated/parsed by a parser (e.g., 408, 508) and is not displayed on device 602. In other words, data may be transmitted to the parser while a display of device 602 is off/not active (e.g., device 602 is "asleep" or "locked").

Figure 7:
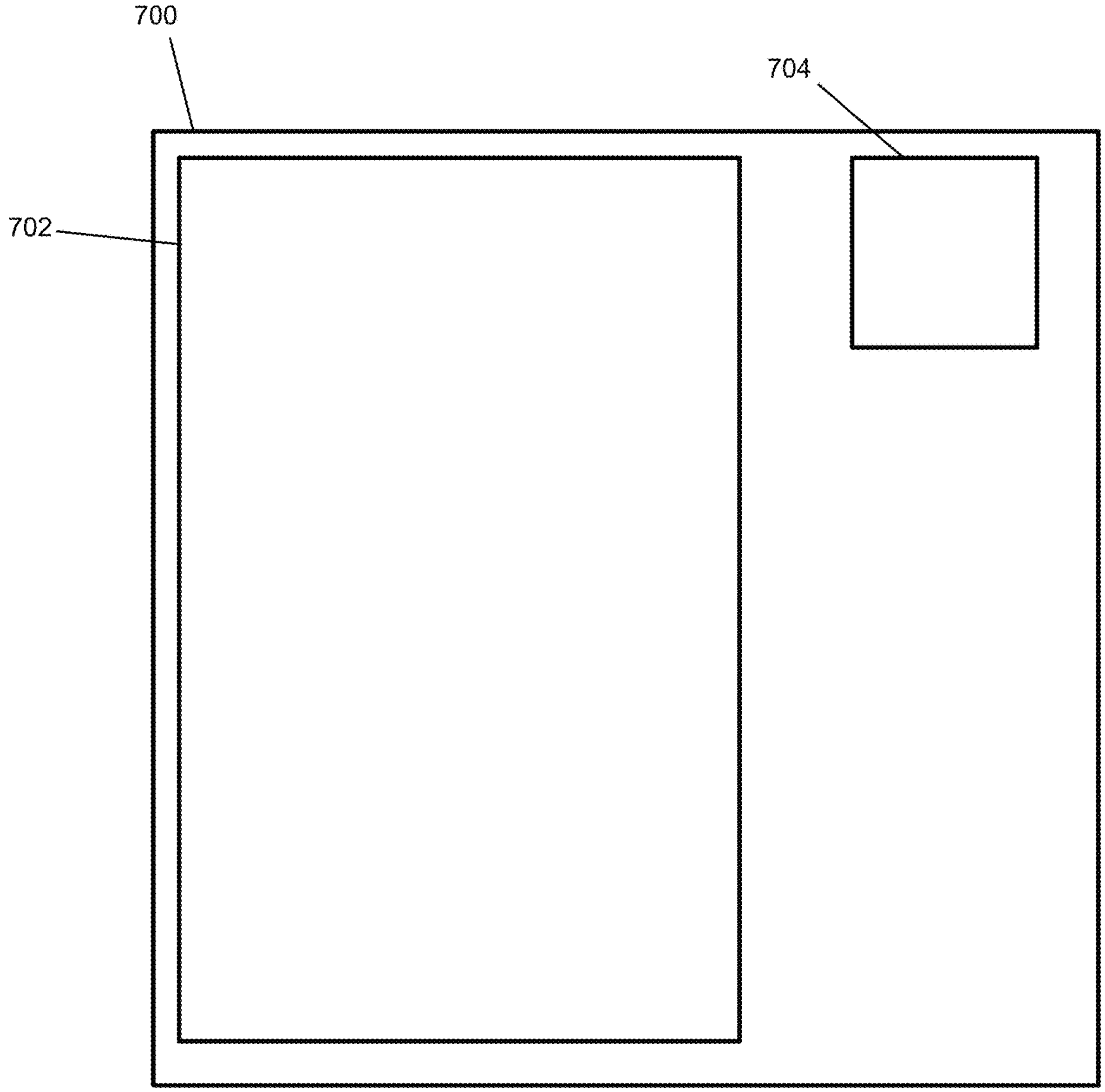
FIG. 7 illustrates a diagram of an example display device of a known gaming machine including display of player tracking information

FIG. 7 illustrates a diagram of an example display device 700 of a known gaming machine including display of player tracking information. Device 700 includes a primary display area 702 and a secondary display area 704. For example, a game provider may have designed an electronic game to fill more of a screen of display device 700 than what is shown in FIG. 7. However, upon connection of a player tracking device and a video splitter (e.g., by a casino technician), primary display area 702 has shrunk/been squeezed (e.g., as compared to FIG. 8) in order to make room for secondary display area 704 (e.g., including player tracking information). Accordingly, display of at least the electronic game in area 702 is distorted.

Figure 8:
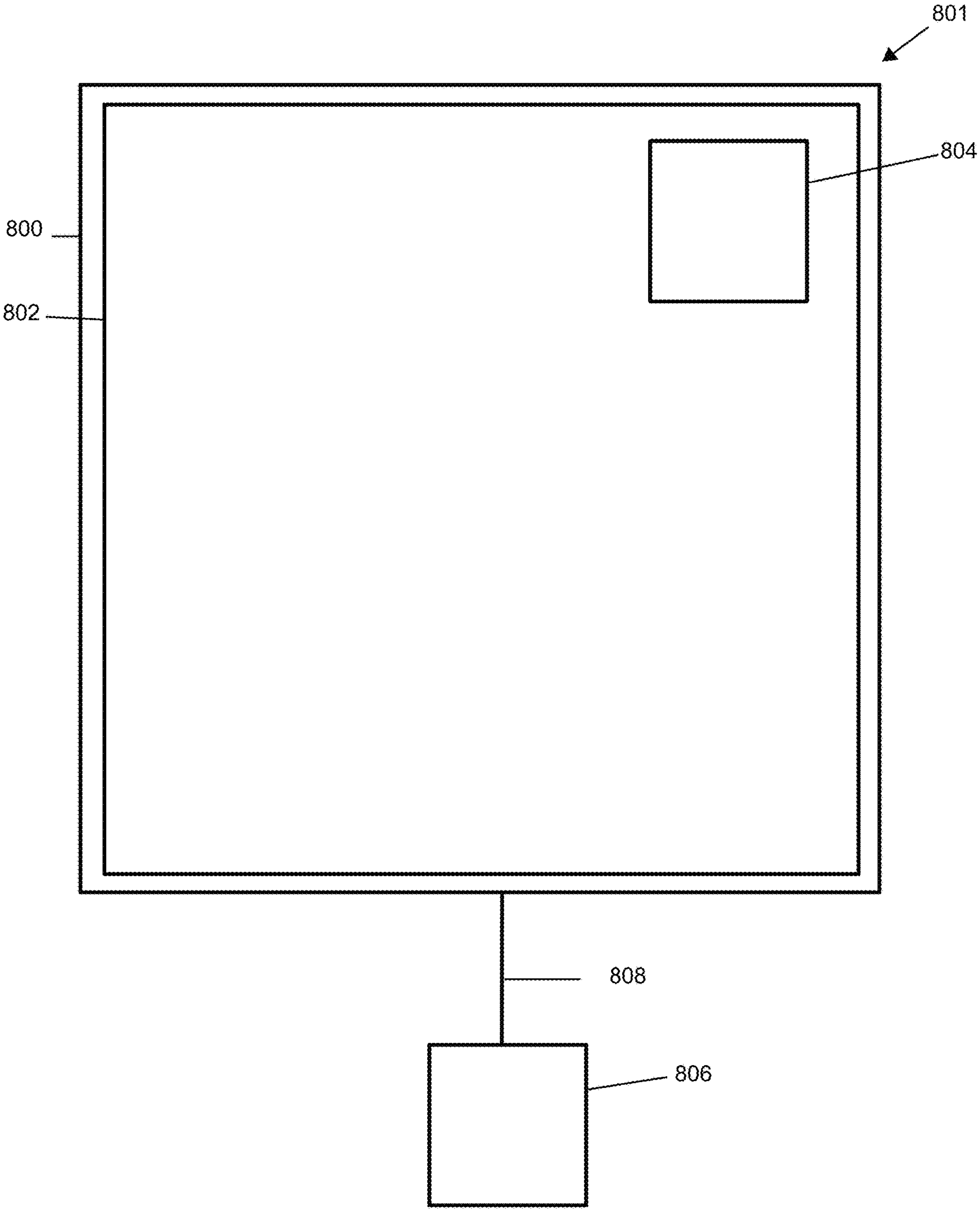
FIG. 8 illustrates a diagram of an example display device of a gaming device connected with a mobile computing device of a player, as shown in FIGS. 4-6.

FIG. 8 illustrates a diagram of an example display device 800 (e.g., display 128) of a gaming device 801 (e.g., 104A-X, 400, 500, 600) connected with a mobile computing device of a player, as shown in FIGS. 4-6. Notably, in contrast to FIG. 7, a game displayed in primary display area 802 is full size while device 800 still includes display of further information (e.g., player tracking information) in secondary display area 804. As described herein, the location of secondary display area 804 may be defined in memory such that a parser (408, 508) can perform a look up to determine where to display information (e.g., player data) received from an end user device 806 (e.g., of a player) in communication (e.g., via connection 808) with device 801.

Notably, a protocol (or extension) allows a processing unit of an external application (e.g., at device 806 and/or server in communication with the device 806 and/or gaming device 801) to directly work with gaming device 801 to utilize capabilities of gaming device 801 (e.g., its peripherals, internal input and output devices) without disrupting the game and presenting the information in a neat and orderly manner. Gaming device 801 operating system manages the priority and placement of the outputs/inputs required by the external application(s) (e.g., player tracking). Gaming device 801 has the ability to host multiple applications.

In some embodiments, player tracking information is displayed on the button deck display (e.g., 610) and/or a main display (e.g., 800). Sound/audio outputs may also be provided (e.g., audio messages regarding player loyalty/tracking, such as congratulatory messages when a player completes an achievement related to the external application). In some embodiments, a touch pad interface is displayed (e.g., at device 610 and/or 800) for input of security codes. In some embodiments, a feed from a camera or sensor within gaming device 801 is utilized along with the external application (e.g., to verify the identity of a player by biometric matching (e.g., fingerprint, facial recognition, etc.) or scanning a QR code (static or dynamic), as examples).

Further, a player account may be connected to an online environment. The present disclosure allows for mobile device applications and information to be presented on gaming device 801. For example, the mobile device applications may include an online gaming application, operator website, and/or other applications.

In some embodiments, the external application is enabled using Game to System (G2S) and Serial Attached SCSI (SAS) protocols with appropriate extensions to communicate with gaming device 801. Information, such as presentation layer data sent to the gaming device 801, may be translated and displayed in appropriate (e.g., predetermined) form on a designated/predetermined portion of a button deck (e.g., 601) or main display (e.g., 800) (e.g., to remove the need for video splitting—as shown in FIGS. 6 and 8). This information may be transmitted to gaming device 801 via Ethernet or Serial connections. In addition, external devices (e.g., end user device(s) 806) can communicate with gaming device 800 via Bluetooth or other Near Field Communication (NFC) technology. In some embodiments, an input device such as keypad may be presented at gaming device 801 for the player to input security codes. Gaming device

801 may then transmit the inputs back to the application at end user device 806 (e.g., or a server) to verify/authenticate player identity.

In some embodiments, gaming device information (e.g., what display space is available to the external application such as screen size or pixels per inch, touch capabilities, etc.) is transmitted from device 801 to the application at the end user device. The application may then utilize the gaming device information to determine what data to provide back to gaming device 801 for display. In some embodiments, the application is not aware of the gaming device information (e.g., as described above) and a parser (e.g., 408, 508) of gaming device 801 determines what information received from the application (e.g., at the end user device) to display. For example, rules may be stored in memory (e.g., in one or more lookup tables) that the parser utilizes in order to determine what received information to display, when to display the information, and how to display the information. For instance, gaming device 801 may determine to wait to display information received from end user device 806 until a bonus/celebratory animation has completed at gaming device 801 (e.g., in response to the player winning a jackpot or bonus). In some embodiments, the gaming device may wait to display information received from end user device 806 (e.g., data regarding a phone conversation or mobile app at device 806) when a player is in a fast-playing tournament-mode competing with other players (e.g., because interruptions may disrupt performance in the fast-playing tournament-mode).

In other words, applications may be hosted/stored on end user device 806 of a player. Gaming device 801 may connect 808 to end user device 806 and receive data associated with the one or more applications. Data from the one or more applications is parsed (e.g., by parser 408, 508) in order to determine which information to display, when to display it, and how to display it. Further, protocols/rules defining interaction/priority of multiple applications may be defined/stored such that the parser can determine which information from which applications to display when.

In some embodiments, for example, an external application related to player tracking and an external application related to an electronic game may be executed at end user device 806. End user device 806 may connect to gaming device 801, and gaming device 801 may receive data regarding the one or more applications from end user device 806. Gaming device 801 then determines when and where to display information associated with the player tracking application and/or the game information. For example, gaming device 801 may determine from the player tracking application that it is the player's birthday and change display of a theme of a game in response to determining that it is the player's birthday (e.g., providing birthday celebration scenes/animations). Further, a game at gaming device 801 may be related to the electronic game external application. By playing the game at gaming device 801, the player may earn/satisfy one or more achievements associated with the electronic game external application (e.g., one or more plays, playing for a certain amount of time, playing at a number of locations, etc.). Accordingly, gaming device 801 may receive data regarding the satisfied achievement from end user device 806 and cause display of information indicating that the player earned the achievement.

It should be appreciated that any number and/or a variety of external applications are envisioned as being supported by gaming device 801 in the embodiments described herein. As examples, external applications may include travel, food & beverage, entertainment applications (e.g., associated with reward programs and/or achievements/goals for the player to achieve), or any other application ("app"). Rewards and/or other information in the external applications may be achieved by the player connecting device 806 to gaming device 801, playing a game at gaming device 801, or the player meeting other criteria. Accordingly, by way of the systems and methods described herein, gaming device 801 receives data regarding the external applications, parses the data, and determines what to display on gaming device 801 and when/where to display it (e.g., based upon rules stored in memory). Accordingly, gaming device 801, by supporting all external applications, receives more data than was previously known to gaming devices 801 and can cause display (and/or other output, such as sound) of information related to those external applications in predetermined ways and without the need for one or more video splitters that are problematic at least for the reasons described herein.

In some embodiments, preferences may be defined by a player (e.g., in their player account). Accordingly, gaming device 801 may receive data (e.g., from an end user device or player tracking server) regarding when/where/how the player prefers certain information be displayed. For example, the player may want information to be displayed regarding certain external applications and not others. Further, the player may be able to select where they prefer certain information be displayed. Yet further, the player may be able to define which game they desire to play at gaming device 801. Accordingly, player preferences communicated to gaming device 801 may not only cause information regarding external applications to be displayed based upon certain rules, but may also cause changes to game play on gaming device 801 (e.g., which game is played, how certain game information is displayed (e.g., font size, color, certain animations/symbols, etc.)).

In some embodiments, a player may be able to select (e.g., at gaming device 801 or end user device 806) which applications gaming device 801 should display information about. For example, gaming device 801 may cause display of an icon area/task bar including icons relating to different external applications (e.g., pre-stored and/or based upon data received from end user device 806 regarding which external applications are used by end user device 806). Accordingly, a player may be able to select (e.g., via touch screen capability at the icon area, such as 804) which application(s) the gaming device should display information about. In some embodiments, the icons displayed in the icon area may be modified if a notification regarding the icon (e.g., the application associated with the icon) is received by the gaming device. For example, gaming device 801 may receive data from an external application at end user device 806 indicating that the player received a text message and may notify a player that a text message was received at end user device 806. As another example, the player may have an upcoming dinner reservation. Accordingly, an external application at end user device 806 (e.g., associated with a restaurant and/or other application where reservations can be made) may communicate to gaming device 801 that a reservation is upcoming, gaming device 801 may parse the communication and cause display of a notification that the player has an upcoming dinner reservation. As such, certain supported external applications may be related to game play (e.g., player tracking, mobile gaming applications) while others are not related to game play (e.g., rideshare, travel, food & beverage, entertainment, etc.).

It should be appreciated that the external applications described herein may be any application at end user device 806, and accordingly data regarding any notifications that may be received at those applications may be communicated to gaming device 801 (e.g., that a rideshare/taxi requested by the player is arriving soon/has arrived, that a flight associated with the player is delayed, that a hotel room is ready for a player, that a delivery has arrived for the player, that tickets for an event have been transferred to an account associated with the player, a live event notification (e.g., an event has started/ended), a social media notification, a live sport event/game score, a real-time stock ticker price, and so forth). The systems and methods described herein also "open up" (e.g., configure) gaming device 801 for future external applications such that the future external applications can utilize gaming device 801 capabilities to cause display of certain information and interact with the player.

Gaming device 801 parses the information and determines (e.g., based upon rules in memory) which information to display to the player (e.g., the notification may be as simple as a notifying the player that a notification was received at their end user device, and/or the notification may include more/all pertinent data relating to the notification—in one example, gaming device 801 may notify the player that a text message was received at end user device 806, while in another example gaming device 801 may display the text of the text message itself). In some embodiments, players may be able to select how notifications are displayed and/or what data is transmitted to gaming device 801 (e.g., for security purposes).

In some embodiments, gaming device 801 may be "game aware" or otherwise more "aware" (e.g., as related to mobile game applications or other applications on end user device 806). In other words, in addition to receiving certain data regarding external applications from end user device 806, gaming device 801 may also be in communication with one or more computing devices (e.g., servers 106-114) storing player information as it relates to the application(s). Accordingly, gaming device 801 may determine that an achievement with respect to a mobile game application (or other application) is met (e.g., or other notification should be presented to the player) by way of a communication received from a server or other computing device (e.g., as opposed to directly receiving the information from end user device 806).

Figure 9:
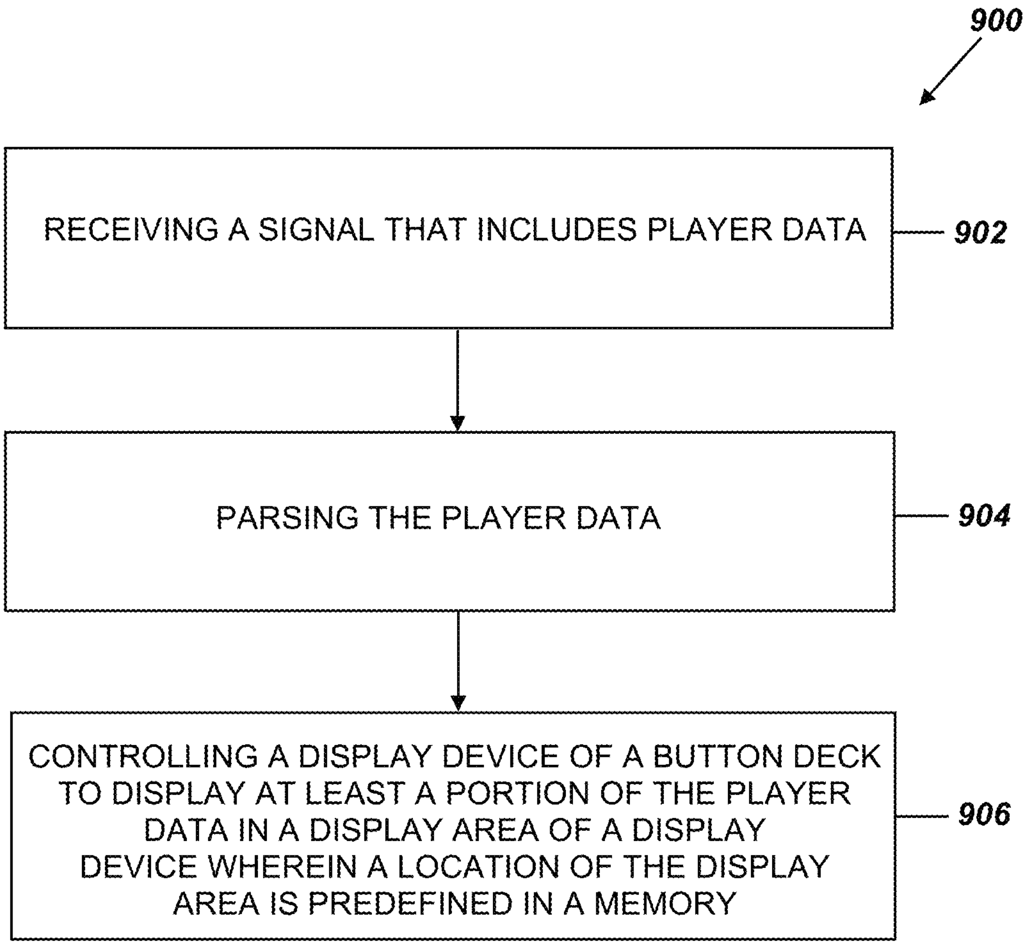
FIG. 9 illustrates an example method for supporting one or more external applications at a gaming device, as described herein.

FIG. 9 illustrates an example method 900 for supporting one or more external applications at a gaming device, as described herein. In the example embodiment, method 900 includes receiving 902 a signal that includes player data (e.g., player tracking data, online gaming data, and/or any other data), parsing 904 the player data, and controlling 906 a display device of a button deck (e.g., button deck 601) to display at least a portion of the player data in a display area (e.g., of display device 610) of the display device, wherein a location of the display area is predefined in the at least one memory.

In some embodiments, method 900 includes causing at least one processor to control a second display device of the electronic gaming device to display at least a second portion of the player data in a display area of the second display device wherein the second display device is configured to display an electronic game. In some embodiments, method 900 includes analyzing the player data, determining the portion of the player data to be displayed based upon priority rules stored in at least one memory, and controlling the display device to display the portion of the player data in the display area based upon the determination. In some embodiments, method 900 includes analyzing game data of an electronic game played at the electronic gaming device, based upon the game data, determining a predefined period of time to delay before controlling the display device to display the portion of the player data, and after the predefined period of time has expired, controlling the display device to display the portion of the player data.

Systems and methods for supporting one or more external applications at a gaming device are described herein. As used herein, external application may mean an application executed on/hosted by an end user device of a player (e.g., an "app" at an end user device such as a mobile/smart phone, tablet, etc.). In some embodiments, a mobile computing device (e.g., end user device) may be connected to a gaming device/button deck using a physical interface, such as a wired connection. In some embodiments, the mobile computing device may be connected to the gaming device/button deck using a wireless interface, such as a BLUETOOTH, WiFi, NFC, and/or any other suitable wireless interface. The button deck and/or a gaming device of the button deck may include a device, such as a parser, configured to filter or otherwise obtain at least one signal component from a signal provided by the mobile computing device, such as a video signal and/or player information (e.g., player tracking information). The video component of the signal may be displayed on the button deck, such as on a display device of the button deck, for convenient access by the player during gameplay as well as to conserve space for display of an electronic game on a main display of the gaming device. In the example embodiment, the area where the parsed signal is displayed is stored in memory (e.g., so that it is predetermined where the parsed information is displayed, and no video "splitting" or "shrinking" is required).

A system for connecting a mobile computing device of a player to a button deck is thus described. In some embodiments, a mobile computing device may be connected to a button deck using a physical interface, such as a wired connection. In some embodiments, the mobile computing device may be connected to the button deck using a wireless interface, such as a BLUETOOTH, WiFi, NFC, and/or any other suitable wireless interface. The button deck and/or a gaming device of the button deck may include a device, such as a processor and/or parser, configured to filter or otherwise obtain at least one signal component from a signal provided by the mobile computing device, such as a video signal. The video component of the signal may be displayed on the button deck, such as on a display device of the button deck, for convenient access by the player during gameplay as well as to conserve space for display of a wagering game on a main display of the gaming device. In some embodiments, the parser and/or other processor may be disposed within the button deck to parse an incoming signal from a mobile device. Likewise, in at least some embodiments, a relay device may be included in the gaming device and/or in the button deck to accommodate the same, or similar, functionality. In some embodiments, one or more connectors may be used to couple the button deck to a system bus (or "backplane"), to facilitate communication of data received from the mobile computing device back and forth between the button deck, gaming device, and/or mobile computing device. In embodiments that use the relay device as an intermediate component coupled between the button deck and the gaming device, the relay device may be included in a button deck during manufacture and/or retrofitted in the button deck to enhance the functionality of the button deck and gaming device.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electronic gaming device comprising:
- a button deck including a display device;
- at least one memory with instructions stored thereon; and
- at least one processor in communication with the display device and the at least one memory, wherein the instructions, when executed by the at least one processor, cause the at least one processor to:
  - receive, from an end user device associated with a player account, a signal that includes player data;
  - parse the player data;
  - analyze game data of an electronic game played at the electronic gaming device;
  - based upon the game data, determine a predefined period of time to delay before controlling the display device to display a portion of the player data; and
  - after the predefined period of time has expired, control the display device to display at least the portion of the player data in a display area of the display device, wherein a location of the display area is predefined in the at least one memory.

2. The electronic gaming device of claim 1 further comprising a second display device, wherein the instructions further cause the at least one processor to control the second display device to display at least a second portion of the player data in a display area of the second display device, wherein the second display device is configured to display an electronic game.

3. The electronic gaming device of claim 1, wherein the instructions further cause the at least one processor to:
- analyze the player data;
- determine the portion of the player data to be displayed based upon priority rules stored in the at least one memory; and
- control the display device to display the portion of the player data in the display area based upon the determination.

4. The electronic gaming device of claim 1, wherein the instructions further cause the at least one processor to:
- receive a connection request from the end user device;
- cause display of an input area on the display device;
- receive an input at the input area; and
- in response to verifying the input with a stored security code associated with the player account, connect to the end user device.

5. The electronic gaming device of claim 1, wherein the instructions further cause the at least one processor to:
- receive second data, the second data comprising online gaming data;
- parse the second data;
- determine to replace display of the portion of the player data with a portion of the second data; and
- cause display of the portion of the second data in the display area.

6. The electronic gaming device of claim 1, wherein the player data comprises player tracking data associated with the player account.

7. The electronic gaming device of claim 1, wherein the player data comprises at least one of travel data, lodging data, food data, live event data, and social media data.

8. An electronic gaming system comprising:
- a button deck including a display device;
- at least one memory with instructions stored thereon; and
- at least one processor in communication with the display device and the at least one memory, wherein the instructions, when executed by the at least one processor, cause the at least one processor to:
  - receive, from an end user device associated with a player account, a signal that includes player data;
  - parse the player data;
  - analyze game data of an electronic game played at the electronic gaming device;
  - based upon the game data, determine a predefined period of time to delay before controlling the display device to display a portion of the player data; and
  - after the predefined period of time has expired, control the display device to display at least the portion of the player data in a display area of the display device, wherein a location of the display area is predefined in the at least one memory.

9. The electronic gaming system of claim 8, further comprising a second display device, wherein the instructions further cause the at least one processor to control the second display device to display at least a second portion of the player data in a display area of the second display device, wherein the second display device is configured to display an electronic game.

10. The electronic gaming system of claim 8, wherein the instructions further cause the at least one processor to:
- analyze the player data;
- determine the portion of the player data to be displayed based upon priority rules stored in the at least one memory; and
- control the display device to display the portion of the player data in the display area based upon the determination.

11. The electronic gaming system of claim 8, wherein the instructions further cause the at least one processor to:
- receive a connection request from the end user device;
- cause display of an input area on the display device;
- receive an input at the input area; and
- in response to verifying the input with a stored security code associated with the player account, connect to the end user device.

12. The electronic gaming system of claim 8, wherein the instructions further cause the at least one processor to:
- receive second data, the second data comprising online gaming data;
- parse the second data;
- determine to replace display of the portion of the player data with a portion of the second data; and
- cause display of the portion of the second data in the display area.

13. The electronic gaming system of claim 8, wherein the player data comprises player tracking data associated with the player account.

14. The electronic gaming system of claim 8, wherein the player data comprises at least one of travel data, lodging data, food data, live event data, and social media data.

15. A method of displaying data at a button deck of an electronic gaming device, the method implemented by at least one memory and at least one processor, the method comprising:

receiving, from an end user device associated with a player account, a signal that includes player data;

parsing the player data;

analyzing game data of an electronic game played at the electronic gaming device;

based upon the game data, determining a predefined period of time to delay before controlling a display device of the button deck to display a portion of the player data; and after the predefined period of time has expired, controlling a display device of the button deck to display at least the portion of the player data in a display area of the display device, wherein a location of the display area is predefined in the at least one memory.

16. The method of claim 15, further comprising causing the at least one processor to control a second display device of the electronic gaming device to display at least a second portion of the player data in a display area of the second display device, wherein the second display device is configured to display an electronic game.

17. The method of claim 15, further comprising:

analyzing the player data;

determining the portion of the player data to be displayed based upon priority rules stored in the at least one memory; and controlling the display device to display the portion of the player data in the display area based upon the determination.

* * * * *